United States Patent Office 2,875,192
Patented Feb. 24, 1959

2,875,192
AZO-DYESTUFFS

Raymond Gunst, Binningen, Switzerland, assignor to Ciba Limited, Basel, Switzerland, a Swiss firm No Drawing. Application October 25, 1957
Serial No. 692,256

Claims priority, application Switzerland October 29, 1956

10 Claims. (Cl. 260—153)

This invention provides valuable new azo-dyestuffs which contain a halogenated triazine radical. These new azo-dyestuffs, in the form of the free acids, correspond to the formula (1)

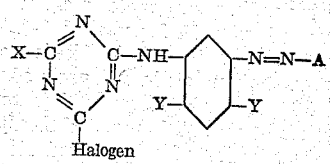

in which A represents the residue of a coupling component which may contain an azo linkage, one Y represents a sulfonic acid group and the other a hydrogen atom, and X represents the radical of dehydrothiotoluidine sulfonic acid bound to the carbon atom through its amino group.

The dyestuffs of this invention can be made by starting from appropriate dyestuffs, obtainable by methods in themselves known, which contain a dihalogen-, and more especially a dichloro-1:3:5-triazine radical, and replacing one of the two chlorine atoms in the dichloro-triazine dyestuff by the corresponding radical by reaction with dehydrothiotoluidine monosulfonic acid. The dihalogen-triazine dyestuffs to be used as starting materials can be made by methods in themselves known by reacting an azo-dyestuff of the formula (2)

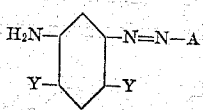

in which one Y represents a sulfonic acid group and the other a hydrogen atom, and A represents the radical of a coupling component which may contain an azo linkage, with a cyanuric halide, especially with cyanuric chloride (2:4:6-trichloro-1:3:5-triazine) in a molecular ratio of at least 1:1, or they can be obtained by coupling with a coupling component a diazo component containing the appropriate dichloro-triazine radical.

For making the dyestuff of this invention there may be used, for example, coupling components which owe their capacity for coupling to the presence of an amino group or hydroxyl group, and preferably cyclic keto-methylene-compounds capable of coupling in a position vicinal to the keto group. As examples of such coupling components there may be mentioned: Para-cresol, 2-carboxyl-1-hydroxy-benzene, naphthols such as α- or β-naphthol, aromatic amines of the benzene or naphthalene series, for example, cresidine, ortho- or meta-toluidine, para-xylidene, α- or β-naphthylamine, 2-hydroxynaphthalene sulfonic acid amides and amino- and/or hydroxy-naphthalene sulfonic acids or N-alkyl- or N-aryl- or N-acyl-derivatives thereof, such as 1-hydroxy-naphthalene-3-, -4-, -5- or -8-sulfonic acid, 2-hydroxynaphthalene-4-, -5-, -6-, -7- or -8-sulfonic acid, 1:8-dihydroxy-naphthalene- 3:6-disulfonic acid, 2-hydroxynaphthalene-3:6- or -6:8-disulfonic acid, 1-hydroxynaphthalene-3:6- or -3:8-disulfonic acid, 2-amino-naphthalene-6-sulfonic acid, 2-amino-8-hydroxynaphthalene-6-sulfonic acid, 2-amino-5-hydroxynaphthalene-7-sulfonic acid, 2-amino-6-hydroxynaphthalene-8-sulfonic acid, 2-phenylamino-5-hydroxynaphthalene-7-sulfonic acid, 2-methylamino-8-hydroxynaphthalene-6-sulfonic acid, 2-phenylamino-8-hydroxynaphthalene-6-sulfonic acid, 1-amino-8-hydroxy-naphthalene-4-sulfonic acid, 1-amino-8-hydroxynaphtha-lene-2:4-, -3:6- or -4:6-disulfonic acid and especially the N-acyl-derivatives of these amino-naphthol sulfonic acids which contain as the acyl radical, for example, an acetyl, propionyl, chlor-acetyl, benzoyl, tertiary-butyl-benzoyl, 3'- or 4'-aminobenzoyl, methane-sulfonyl or ethane-sulfonyl, para-toluene-sulfonyl, or chlorobenzene-sulfonyl group or a carbomethoxy or carboethoxy group or an acyl radical derived from a cyanuric acid, for example, a radical of the formula

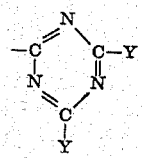

in which the two Y's represent halogen atoms, hydroxyl groups or amino groups, and especially substituted amino groups. There may also be used as coupling components 5:5'-dihydroxy-2:2'-dinaphthyl-urea-7:7'-disulfonic acid and 5:5'-dihydroxy-2:2'-dinaphthylamine-7:7'-disulfonic acid, which, like 1-amino-8-hydroxynaphthalene-3:6-disulfonic acid, are capable of coupling twice with the aforesaid diazo components. There may also be used as coupling components more especially cyclic keto-methylene compounds such as barbituric acid and pyrazolones, especially 5-pyrazolones, capable of coupling in the 4-position, such as 3-methyl-5-pyrazolone, 1-phenyl-3-methyl-5-pyrazolone, 1-phenyl-3-methyl-5-pyrazolone-2'-, -3'- or -4'-sulfonic acid, 1-phenyl-5-pyrazolone-3-carboxylic acid, 5-pyrazolone-3-carboxylic acid amides, because the disadvantageous influence of the dehydrothiotoluidine radical with respect to fastness to light is considerably less pronounced in the case of yellow dyestuffs obtainable from cyclic keto-methylene compounds than it is in the case of other tints.

There may also be used as coupling components compounds capable of coupling which contain azo linkages, for example, monoazo-compounds obtainable, for example, by coupling in an acid medium simple diazo-compounds of the benzene or naphthalene series (for example, diazotised naphthylamines, anilines, chloranilines or nitroanilines, toluidines, 2-amino-benzoic acids, 5-nitro-2-aminobenzoic acids or nitro-amino-phenols, chloro-aminophenols etc.) with 2-amino-5-hydroxynaphthalene-7-sulfonic acid or 1-hydroxy-8-aminonaphthalene-3:6-disulfonic acid. From the monoazo-compounds so obtained valuable disazo- and polyazo-dyestuffs can be produced with the diazo-compounds used in the process of this invention by coupling in a weakly acid medium, the said azo-dyestuffs containing at least once the characteristic halogen-triazine grouping.

For making the azo-dyestuffs of the Formula 2 used as starting materials there are used as diazo-components diazotised monoacyl-derivatives of 1:3-diaminobenzene-4-sulfonic acids, of which the acyl radical is hydrolysed after coupling to liberate the amino group.

The condensation of the amino-azo-dyestuffs obtained from the aforesaid components, with cyanuric chloride is carried out in a manner such that two exchangeable halogen atoms remain in the condensation product, of which one is exchanged in the process of this invention for the radical of dehydrothiotoluidine sulfonic acid.

Instead of producing the dihalogen-triazine dyestuffs to be used as starting materials in the process of this invention from amino-azo-dyestuffs of the Formula 2, they may be obtained by coupling the aforesaid coupling components with the diazo-compounds of the primary condensation products of cyanuric chloride with 1:3-diaminobenzene-4-sulfonic acid.

The azo-dyestuffs of this invention can be prepared with advantage by a modification of the process described above. In this modification an amino-azo-dyestuff of the Formula 2 used as starting material for making the dichloro-triazine dyestuff is condensed with a dihalogen-triazine of the formula (3)

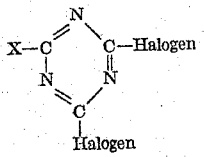

in which X has the meaning given in connection with Formula 1.

The dihalogen-triazines of the Formula 3 can be made by methods in themselves known from cyanuric halides, such as cyanuric bromide or cyanuric chloride, for example, by reacting one molecular proportion of cyanuric chloride with one molecular proportion of dehydrothiotoluidine mono-sulfonic acid. The dihalogen-triazine-compounds of the Formula 3 so obtained may be condensed, for making the azo-dyestuffs of this invention, with preformed amino-azo-dyestuffs of the Formula 2 or advantageously with the 1:3-diaminobenzene-4-sulfonic acid used for making the said dyestuffs. Alternatively, one molecular proportion of 1:3-diaminobenzene-4-sulfonic acid may be condensed first with one mol of cyanuric chloride and then with one mol of dehydrothiotoluidine monosulfonic acid, and the resulting secondary condensation product, which contains a labile chlorine atom, is diazotised and coupled with a coupling component of the kind referred to above.

In making the dyestuffs of this invention by condensing one of the aforesaid amino-azo-dyestuffs with cyanuric chloride and dehydrothiotoluidine monosulfonic acid the condensations may be carried out usually in any desired sequence, but in making the dyestuffs by the coupling method it is generally of advantage to carry out the condensations necessary for making the secondary condensation products to be used as diazo-components in such manner that a dihalogen-triazine of the Formula 3 is formed first and the latter is subsequently condensed with the 1:3-diaminobenzene-4-sulfonic acid.

The dyestuffs obtained by the above process and modifications thereof can be isolated and worked up into dry dyestuff preparations. The dyestuffs are advantageously isolated at as low a temperature as possible by salting out and filtration. The filtered dyestuffs may be dried, if desired, after the addition of extenders. The drying is advantageously carried out at not too high a temperature and under reduced pressure. By spray drying the whole mixture in which the dyestuff is prepared it is possible in some cases to obtain dry preparations directly, that is to say, without isolating the dyestuff.

The new dyestuffs of this invention are suitable for dyeing and printing a very wide variety of materials, especially cellulosic materials of fibrous structure, such as linen, regenerated cellulose and above all cotton. They are especially suitable for dyeing by the so-called pad dyeing process, in which the goods are impregnated with an aqueous solution of the dyestuff which may also contain a salt, and the dyestuff is fixed by treatment with an alkali, advantageously at a raised temperature. This process and the direct dyeing process, which can also be used for many of the dyestuffs of this invention, yield valuable dyeings which are usually distinguished by the purity of their tints, by their good fastness to light and above all by their excellent fastness to washing.

The following examples illustrate the invention, the parts and percentages being by weight:

Example 1

61.9 parts of the secondary condensation product from 1 mol of dehydrothiotoluidine monosulfonic acid, 1 mol of 2:4-diaminobenzene-1-sulfonic acid and 1 mol of cyanuric chloride, are well stirred in 1000 parts of water and 25 parts of hydrochloric acid of 30% strength, and diazotised with 6.9 parts of sodium nitrite (dissolved in 50 parts of water) at about 20° C. The diazotisation is complete in about 2 hours. The diazo-suspension is neutralised with sodium carbonate to a weakly acid reaction, and coupled with 32.3 parts of 1-(2':5'-dichlorophenyl)-3-methyl-5-pyrazolone-4'-sulfonic acid, which is dissolved as the sodium salt in 500 parts of water, in the presence of 30 parts of sodium carbonate. The coupling is complete in about 2 hours, and the dyestuff is precipitated by the addition of salt, filtered off with suction, and dried at 40° C. The dyestuff is a yellow powder, which dyes cotton by the pad dyeing process or from an alkaline solution having a high concentration of salt, pure greenish yellow tints.

A dyestuff having a more greenish shade is obtained by using barbituric acid as coupling component, instead of the aforesaid pyrazolone.

Similar dyestuffs yielding somewhat more reddish yellow dyeings are obtained by using, instead of the aforesaid pyrazolone, a corresponding quantity of 3-methyl-5-pyrazolone or of 1-phenyl-3-methyl-5-pyrazolone-2'-, -3'- or -4'-sulfonic acid or of 1-naphthyl -(2')-3-methyl-5-pyrazolone-4':8'- disulfonic acid or 1-naphthyl-(2')-3-methyl-5-pyrazolone-5':7'- or -6':8'-disulfonic acid, or of 5-pyrazolone-3-carboxylic acid.

Example 2

61.9 parts of the condensation product of the formula

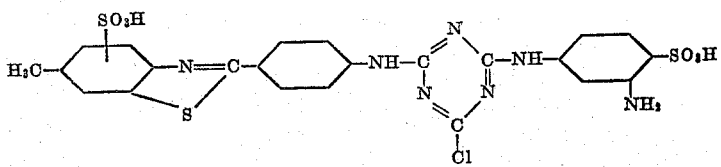

obtained by condensing dehydrothiotoluidine monosulfonic acid and 2:4-diaminobenzene-1-sulfonic acid with cyanuric chloride, are stirred well in 1000 parts of water and 25 parts of hydrochloric acid of 30% strength, and diazotised with 6.9 parts of sodium nitrite (dissolved in 50 parts of water) at about 20° C. The diazotisation is complete in about 2 hours. The diazo-suspension is rendered weakly Congo violet with sodium carbonate, and coupled in the presence of 30 parts of sodium carbonate with 42.3 parts of 1-benzoylamino-8-hydroxynaphthalene-3:6-disulfonic acid, which is dissolved in 500 parts of water as the sodium salt. The coupling is complete after about 2 hours, and the dyestuff is precipitated by the addition of salt, filtered off with suction, and dried at 40° C. It is a dark powder which dyes cotton bluish red tints from an alkaline solution having a high concentration of salt.

A dyestuff yielding somewhat less bluish red tints is obtained by using, instead of 1-benzoylamino-8-hydroxynaphthalene-3:6-disulfonic acid, 1-acetylamino-8-hydroxynaphthalene-3:6 - disulfonic acid. A dyestuff yielding scarlet red tints is obtained by using 1-naphthol-4-sulfonic acid as coupling component.

The dehydrothiotoluidine monosulfonic acid referred to in the present specification is a well known intermediate product obtained by sulfonation of dehydrothiotoluidine of the formula

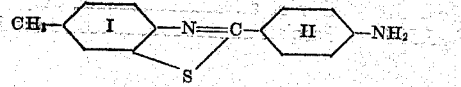

containing a sulfonic acid group in the benzene radical I. According to the present state of our knowledge it is a mixture of the possible isomers wherein the compound containing the sulfonic acid group between the methyl group and the sulfur atom predominates. It is to be understood that as usual in azo dyestuff chemistry free sulfonic acid groups as indicated or for convenience shown in the formula may of course be converted wholly or in part into alkali metal salts.

*Example 3*

2 parts of the dyestuff obtained as described in the first paragraph of Example 1 are dissolved at the boil in 100 parts of water. The resulting stock solution is added to 2900 parts of water at 20° C. After the addition of 30 parts of trisodium phosphate and 60 parts of sodium chloride, 100 parts of cotton are entered, the temperature of the bath is raised to 80° C. in the course of 45 minutes, a further 60 parts of sodium chloride is added, and dyeing is continued for 30 minutes at 90–95° C. The dyeing is then rinsed and after-treated at the boil for 15 minutes in a solution of 2 grams per liter of sodium carbonate and 3 grams per liter of soap, and then rinsed and dried. There is obtained a strong yellow dyeing of very good fastness to washing and light.

What is claimed is:

1. Water-soluble azo-dyestuffs of the formula

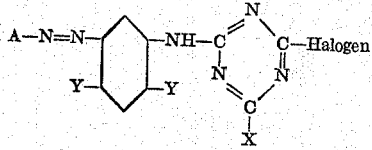

in which X represents the radical of a dehydrothiotoluidine monosulfonic acid bound to the carbon atom through its amino group, one Y represents a hydrogen atom and the other a sulfonic acid group, and A represents the radical of a ketomethylenic heterocyclic coupling component.

2. Monoazo-dyestuffs of the formula

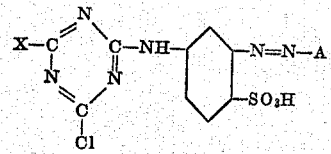

in which X represents the radical of a dehydrothiotoluidine monosulfonic acid bound to the carbon atom through its amino group, and A represents the radical of a 5-pyrazolone bound in the 4-position to the azo linkage.

3. Monoazo-dyestuffs of the formula

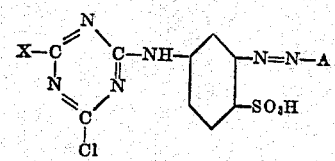

in which X represents the radical of a dehydrothiotoluidine monosulfonic acid bound to the carbon atom through its amino group, and A represents the radical of a 1-phenyl-5-pyrazolone bound in the 4-position to the azo linkage, and of which the phenyl radical contains at least one sulfonic acid group.

4. Monoazo-dyestuffs of the formula

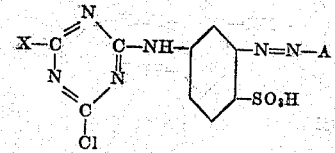

in which X represents the radical of a dehydrothiotoluidine monosulfonic acid bound to the carbon atom through its amino group, and A represents a barbituric acid radical.

5. The monoazo dyestuff of the formula

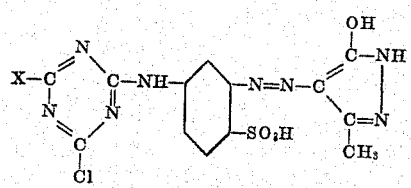

in which X represents the radical of a dehydrotoluidine monosulfonic acid bound to the carbon atom through its amino group.

6. The monoazo dyestuff of the formula

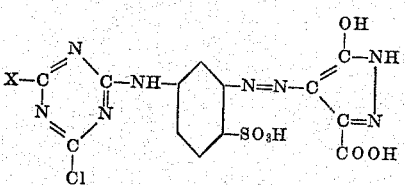

in which X represents the radical of a dehydrothiotoluidine monosulfonic acid bound to the carbon atom through its amino group.

7. The monoazo dyestuff of the formula

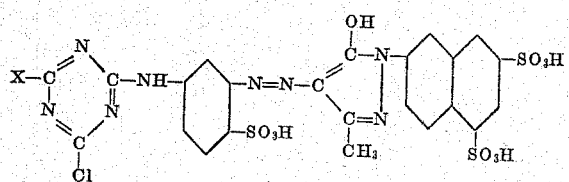

in which X represents the radical of a dehydrothiotoluidine monosulfonic acid bound to the carbon atom through its amino group.

8. The monoazo dyestuff of the formula

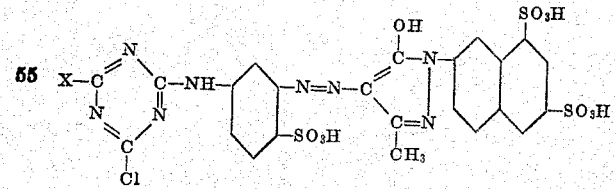

in which X represents the radical of a dehydrothiotoluidine monosulfonic acid bound to the carbon atom through its amino group.

9. The monoazo dyestuff of the formula

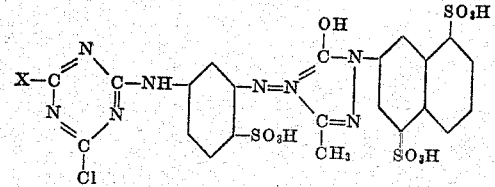

in which X represents the radical of a dehydrothiotoluidine monosulfonic acid bound to the carbon atom through its amino group.

10. The monoazo dyestuff of the formula
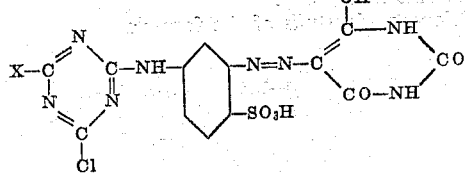
in which X represents the radical of a dehydrothiotoluidine monosulfonic acid bound to the carbon atom through its amino group.
References Cited in the file of this patent
UNITED STATES PATENTS
| | | |
|---|---|---|
| 1,867,451 | Gyr et al. | July 12, 1932 |
| 2,795,576 | Fasciati | June 11, 1957 |